US008015144B2

(12) United States Patent
Zheng et al.

(10) Patent No.: US 8,015,144 B2
(45) Date of Patent: Sep. 6, 2011

(54) LEARNING TRANSPORTATION MODES FROM RAW GPS DATA

(75) Inventors: Yu Zheng, Beijing (CN); Longhao Wang, Beijing (CN); Like Liu, Beijing (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 12/037,305

(22) Filed: Feb. 26, 2008

(65) Prior Publication Data

US 2009/0216704 A1 Aug. 27, 2009

(51) Int. Cl.
*G06F 9/44* (2006.01)
*G06N 7/02* (2006.01)
*G06N 7/06* (2006.01)

(52) U.S. Cl. .......................................... 706/52; 706/21
(58) Field of Classification Search ...................... 706/52
See application file for complete search history.

(56) References Cited

U.S. PATENT DOCUMENTS

| 6,317,684 | B1 | 11/2001 | Roeseler et al. | |
|---|---|---|---|---|
| 6,317,686 | B1 | 11/2001 | Ran | |
| 6,356,838 | B1 | 3/2002 | Paul | |
| 6,411,897 | B1* | 6/2002 | Gaspard, II | 701/209 |
| 6,427,122 | B1* | 7/2002 | Lin | 701/214 |
| 6,430,547 | B1* | 8/2002 | Busche et al. | 707/776 |
| 6,493,650 | B1* | 12/2002 | Rodgers et al. | 702/150 |
| 6,516,272 | B2* | 2/2003 | Lin | 701/214 |
| 6,919,842 | B2 | 7/2005 | Cho | |
| 6,925,447 | B2* | 8/2005 | McMenimen et al. | 705/28 |
| 7,013,290 | B2* | 3/2006 | Ananian | 705/27 |
| 7,219,067 | B1* | 5/2007 | McMullen et al. | 705/7 |
| 7,239,962 | B2 | 7/2007 | Plutowski | |
| 2003/0217070 | A1 | 11/2003 | Gotoh et al. | |
| 2007/0006098 | A1 | 1/2007 | Krumm et al. | |
| 2007/0038362 | A1 | 2/2007 | Gueziec | |
| 2008/0004789 | A1 | 1/2008 | Horvitz et al. | |
| 2008/0004793 | A1 | 1/2008 | Horvitz et al. | |

FOREIGN PATENT DOCUMENTS

| KR | 10-2005-0072555 A | 7/2005 |
|---|---|---|
| KR | 10-2006-0006271 A | 1/2006 |
| WO | 2007145625 A1 | 12/2007 |

OTHER PUBLICATIONS

Decision support systems based on knowledge management, Liping Sui; Services Systems and Services Management, 2005. Proceedings of ICSSSM '05. 2005 International Conference on vol. 2 Digital Object Identifier: 10.1109/ICSSSM.2005.1500178 Publication Year: 2005 , pp. 1153-1156 vol. 2.*

(Continued)

*Primary Examiner* — Michael Holmes

(57) ABSTRACT

Described is a technology by which raw GPS data is processed into segments of a trip, with a predicted mode of transportation (e.g., walking, car, bus, bicycling) determined for each segment. The determined transportation modes may be used to tag the GPS data with transportation mode information, and/or dynamically used. Segments are first characterized as walk segments or non-walk segments based on velocity and/or acceleration. Features corresponding to each of those walk segments or non-walk segments are extracted, and analyzed with an inference model to determine probabilities for the possible modes of transportation for each segment. Post-processing may be used to modify the probabilities based on transitioning considerations with respect to the transportation mode of an adjacent segment. The most probable transportation mode for each segment is selected.

20 Claims, 8 Drawing Sheets

OTHER PUBLICATIONS

Head motion during dialogue speech and nod timing control in humanoid robots, Ishi, C.T.; ChaoRan Liu; Ishiguro, H.; Hagita, N.; Human-Robot Interaction (HRI), 2010 5th ACM/IEEE International Conference on Digital Object Identifier: 10.1109/HRI.2010.5453183 Publication Year: 2010 , pp. 293-300.*

A service-portlet based visual paradigm for personalized convergence of information resources, Yongshan Wei; Zhonglin Sun; Xin Chen; Feng Zhang; Computer Science and Information Technology, 2009. ICCSIT 2009. 2nd IEEE International Conference on Digital Object Identifier: 10.1109/ICCIST.2009.5234767 Publication Year: 2009 , pp. 119-124.*

Research on Information Fusion on Evaluation of Driver Fatigue, Zhang Jun; Zhu Zhong-xiang; Song Zheng-he; Mao En-rong; Computer Science and Computational Technology, 2008. IISCSCT '08. International Symposium on vol. 2 Digital Object Identifier: 10.1109/ISCSCT.2008.284 Publication Year: 2008 , pp. 151-155.*

Simon, et al., "A Mobile Application Framework for the Geospatial Web", May 8-12, 2007. Banff, Alberta, Canada. pp. 381-390.

"Annals of the New York Academy of Sciences", http://www.blackwell-synergy.com/doi/abs/10.1196/annals.1382.017?cookieSet=1&journalCode=nyas.

Liao, et al. "Building Personal Maps from GPS Data", Department of Computer Science & Engineering, University of Washington Seattle, WA 98195. pp. 1-7.

Lafferty, "Conditional Random Fields: Probabilistic Models for Segmenting and Labeling Sequence Data", pp. 1-8.

"CRF++: Yet Another CRF toolkit", http://crfpp.sourceforge.net/.

Toyama, et al. "Geographic Location Tags on Digital Images", MM'03, Nov. 2-8, 2003, Berkeley, California, USA. pp. 1-11.

Chen, et al. "GeoTracker: Geospatial and Temporal RSS Navigation" , WWW 2007, May 8-12, 2007, Banff, Alberta, Canada. pp. 41-50.

Strachan, et al., "gpsTunes—controlling navigation via audio feedback", pp. 1-4.

Patterson, et al. "Inferring High-Level Behavior from Low-Level Sensors", University of Washington, Department of Computer Science and Engineering, Seattle, WA, USA. pp. 1-18.

Liao, et al., "Learning and Inferring Transportation Routines", Department of Computer Science & Engineering University of Washington, Seattle, WA 98195. pp. 1-6.

Liao, et al., "Location-based Activity Recognition", Computer Science & Engineering, University of Washington, Seattle, WA 98195. pp. 1-8.

Wasinger, et al., "M3I in a Pedestrian Navigation & Exploration System", DFKI GmbH, 66123 Saarbrücken, Germany. pp. 1-5.

"North York Moors and Yorkshire Wolds Mountain Bike (MTB) Routes", http://www.mtb-routes.co.uk/northyorkmoors/default.aspx.

Krumm, et al., "Predestination: Inferring Destinations from Partial Trajectories", Microsoft Research, Microsoft Corporation, One Microsoft Way, Redmond, WA USA 98052.

Han., et al., "Predicting User's Movement with a Combination of Self-Organizing Map and Markov Model", Department of Computer Science, Yonsei University, 134 Shinchon-dong, Seodaemun-ku, Seoul 120-749, Korea. pp. 884-893, 2006.

Hariharan., et al., "Project Lachesis: Parsing and Modeling Location Histories", pp. 1-16.

Mitchell., et al., "Six in the City: Introducing Real Tournament—A Mobile IPv6 Based Context-Aware Multiplayer Game", NetGames'03, May 22-23, 2003, Redwood City, California, USA., pp. 91-100.

"SlamXR List Routes, by Microsoft Research Community Technologies Group", http://www.msslam.com/slamxr/ListRoutes.aspx.

"SportsDo", http://sportsdo.net/Activity/ActivityBlog.aspx.

Tezuka., et al., "Toward Tighter Integration of Web Search with a Geographic Information System", WWW 2006, May 23-26, 2006, Edinburgh, Scotland. pp. 1-10.

Twittervision, http://twittervision.com/.

Ashbrook., "Using GPS to Learn Significant Locations and Predict Movement Across Multiple Users", pp. 1-15.

Weka 3—Data Mining with Open Source Machine Learning Software in Java, http://www.cs.waikato.ac.nz/ml/weka/index_home.html.

Welcome to WalkJogRun, http://www.walkjogrun.net/.

WikiWalki, http://www.wikiwalki.com/.

International Search Report and Written Opinion Recieved for PCT Application No. PCT/US2009/032777, mailed on Aug. 26, 2009, 10 pages.

Zheng, et al., "Learning Transportation Mode from Raw GPS Data for Geographic Applications on the Web", Proceeding of the 17th international conference on World Wide Web, Apr. 21-25, 2008, pp. 247-256.

Breiman, Leo (1996), "Bagging predictors". Machine Learning 24 (2): 123-140.

* cited by examiner

LEARNING TRANSPORTATION MODES FROM RAW GPS DATA

RELATED APPLICATIONS

This patent application is related to U.S. patent application Ser. No. 12/037,347 to Zheng et al., entitled, "System for Logging Life Experiences Using Geographic Cues," filed concurrently herewith and incorporated herein by reference; and to U.S. patent application Ser. No. 12/037,263 to Wang et al., entitled, "Indexing Large-Scale GPS Tracks," filed concurrently herewith, and incorporated herein by reference.

BACKGROUND

Many users of global positioning system (GPS) devices upload their GPS data (tracks) to the Internet, sometimes in conjunction with photographs and the like, such as for sharing travel and other experiences. In addition to sharing with others, users that upload their GPS tracks may benefit by having a better record of past events, which helps in reliving past events and gaining an understanding of their life patterns. At the same time, applications can attempt to learn from such GPS data, such as to determine popular routes to recommend to others, plan traffic, and so forth.

In general, raw GPS data are browsed and otherwise analyzed directly, without much understanding or context. For example, it would be more useful to applications if users would manually tag or otherwise annotate their GPS tracks with additional information, such as whether they were walking or riding at a particular time. However, there is generally no motivation for users to do so to benefit some unknown application, and further, it is difficult for people to remember the accurate time during a given trip when such additional information is appropriate to include.

Additional data collected by other sensors such as cellular phone devices and towers, Wi-Fi, RFID, and/or other information extracted from geographic maps, such as road networks, may help in interpreting GPS data, but this has its own drawbacks. Some of the drawbacks include a need to have a sufficient number of sensors available and positioned at meaningful locations, the need to correlate such other data with GPS data, the need for users to have cellular phones and/or Wi-Fi devices active and/or possess RFID tags, and so forth. As a result, only raw GPS data is consistently available.

However, given raw GPS data, simple mechanisms cannot accurately infer additional information such as a user's transportation mode. For example, velocity-based rules for determining whether a user is walking or riding fail when traffic conditions and/or weather cause driving velocity to be as slow as walking. When user takes more than one kind of transportation mode along a trip, the problem becomes more difficult.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which positioning (e.g., raw GPS) data is processed into segments of a trip, with a predicted mode of transportation determined for each segment. In one example implementation, segments are first characterized as walk segments or non-walk segments based on velocity and/or acceleration data gleaned from the GPS data. Features corresponding to each of those walk segments or non-walk segments are extracted, and analyzed with an inference model to determine a most probable mode of transportation for each segment. Before selection of a transportation mode based on the probabilities provided by the inference model, post-processing may consider the possible modes as candidates, and modify their respective probabilities, such as to factor in the probability of transitioning to each candidate from a transportation mode of an adjacent segment.

In one aspect, such as to produce more accurate results, when first characterizing points as corresponding to walk segments or non-walk segments, segments below a threshold merging length are merged into another segment. Further, segments below a threshold uncertainty length may be considered uncertain; an uncertain segment may be merged with one or more other consecutive uncertain segments into a non-walk segment.

The results comprise a predicted mode of transportation inferred for each segment of a trip. The results may be output in some manner, such as to tag the GPS data with information corresponding to the predicted mode of transportation for each segment.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards automatically determining transportation modes from raw GPS data, including multiple transportation modes in a single trip, and detecting transitions between modes. In one example implementation, this is accomplished via a change point-based segmentation method, an inference model, and a post-processing algorithm that is based on conditional probability. In an alternative implementation, conditional random field inference provides the inference model without the need for post-processing.

In one aspect, GPS tracks submitted by users may be automatically tagged with inferred transportation modes, whereby, for example, a user has a better record of the user's own past, while others have more information of the user's experiences when browsing a GPS track. Further, data from active GPS devices (such as built into a cellular telephone with GPS capability) may be dynamically processed to infer a current transportation mode, so that, for example, people can retrieve directions and other information applicable to their current mode of transportation. Examples of dynamic inference include providing map information with different map scales for walking versus riding, providing a relevant bus schedule, and so forth.

While the examples herein are generally directed towards certain transportation modes (e.g., walking, driving, bicycling, commuting by bus), it is understood that these are only examples. As can be readily appreciated, the technology described herein is applicable to many other forms of transit, such as jogging, nautical transit, aeronautical transit, and so forth, alone or in any combination. Further, while various mechanisms such as classifiers are described as being suitable for use in determining a most-likely transportation mode corresponding to particular features within GPS data, other mechanisms may be employed.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and/or data processing in general.

Figure 1:
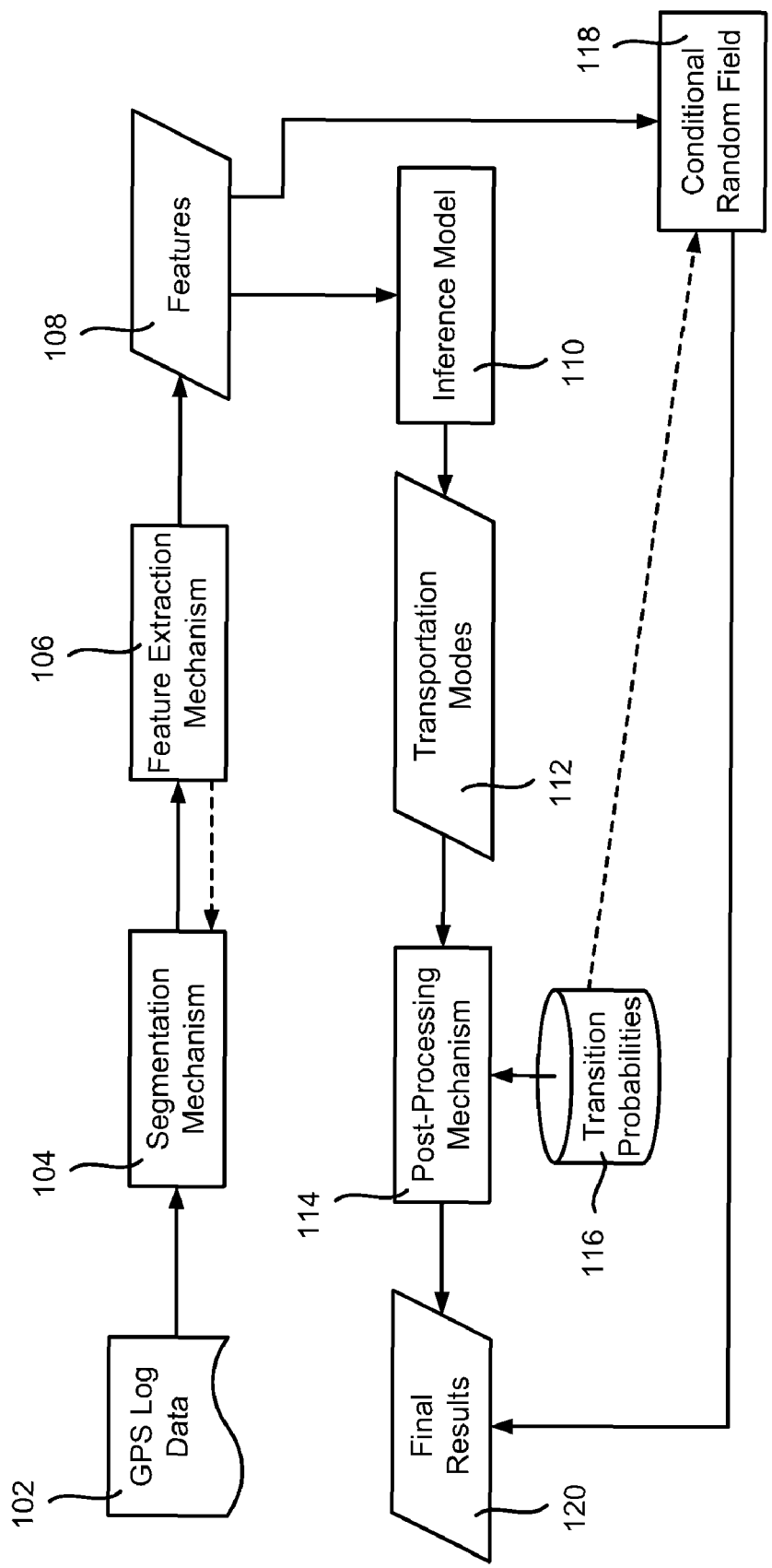
FIG. 1 is a block diagram representing example components for processing GPS data to determine transportation modes.

Turning to FIG. 1, there is shown a general set of components for processing GPS data to determine transportation modes, such as for tagging that data. As shown in FIG. 1 and as described below, when GPS log data 102 (e.g., in a file) is processed to determine transportation modes, a segmentation mechanism 104 divides the GPS data into trips, and then partitions each trip into segments. In general, the segmentation mechanism 104 differentiates trips based on time intervals, and further, distinguishes segments within each trip via change points (CP) detected in the data 102.

Figure 2:
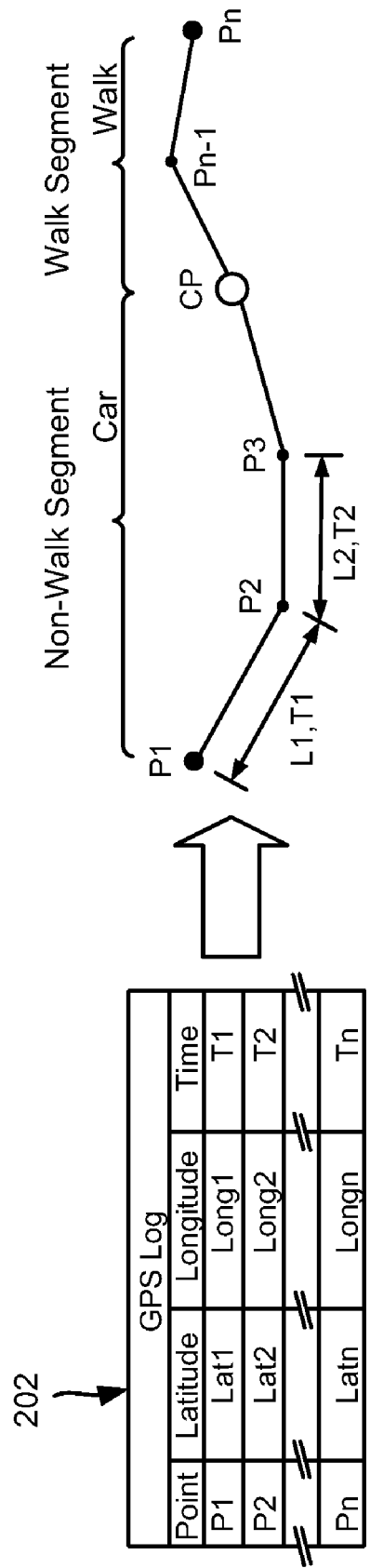
FIG. 2 is a representation of an example set of segments generated from GPS data.

More particularly, as depicted in FIG. 2, an example GPS log 202 comprises a sequence of GPS points P1-Pn (or alternatively, Pi ∈ {P1, P2, . . . , Pn}). Each GPS point Pi comprises a latitude, a longitude and a timestamp. As can be readily appreciated, velocity information and acceleration information may be computed from such data.

Given a GPS log(e.g., 202) to process, the segmentation mechanism 104 sequentially connects the GPS points into a track, and divides the track into trips based on the time interval between the consecutive points, e.g., separate trips are established when the time interval exceeds a certain threshold (e.g., twenty minutes). As will be understood, a change point (CP) represents a place where the user changed a transportation mode, e.g., from riding in a car to walking.

The duration of a trip is the time interval between its start point and end point, while the length of a trip comprises the sum of the distances between consecutive points along the trip (e.g., P1 to P2 plus P2 to P3 . . . plus Pn−1 to Pn). The same general definitions apply to each segment, that is, the duration of a segment is the time interval between its start point and end point, while the length of a segment comprises the sum of the distances between the consecutive points on the segment, e.g., CP to Pn−1, plus Pn−1 to Pn.

Because users often change their mode of transportation during a trip, a trip may contain two or more transportation modes. As described below, the segmentation mechanism 104 separates the segments for different transportation modes first by differentiating walk segments from non-walk segments; note that as used herein, segments likely corresponding to walking are referred to as walk segments, while the segments of other transportation modes (e.g., car, bicycle, bus) are referred to as non-walk segments. Similarly, each of the GPS points of a walk segment, such as Pn−1 in FIG. 2, is referred to as a walk point, while each of the GPS points of non-walk segments, e.g., P2 in FIG. 2, is called a non-Walk Point. In the example of FIG. 2, a trip from P1 to Pn is partitioned into a walk segment and a non-walk segment, with the transition represented by a change point CP.

Change points are detected automatically using rules based on certain observations, namely that people stop, and then go, when changing their transportation modes, that is, there are some GPS data indicative of a velocity close to zero during such a transition. Further, to a high probability, "walk" indicates a transition between different transportation modes, that is, the start point and end point of a walk segment each corresponds to a change point, to a relatively very high probability.

As shown in the following table, the above observations may be measured and have been proven correct in the transition matrix (with transportation mode labels provided for corresponding GPS data by actual volunteer users):

| Transportation modes | Walk | Car | Bus | Bike |
| --- | --- | --- | --- | --- |
| Walk | / | 53.4% | 32.8% | 13.8% |
| Car | 95.4% | / | 2.8% | 1.8% |
| Bus | 95.2% | 3.2% | / | 1.6% |
| Bike | 98.3% | 1.7% | 0% | / |

As can be seen, Car, Bus and Bike modes almost always transition to the Walk mode, with a direct transition between them without walking being quite rare, possibly due to mislabeling. For example, a person may have recorded taking a taxi immediately after getting off a bus, while forgetting to include a very short Walk segment between these two transportation modes when labeling the GPS data. Such events are likely responsible for the small percentages corresponding to a direct transition between Car and Bus; notwithstanding, a Walk segment essentially exists in this situation.

Once segmented, a feature extraction mechanism 106 extracts various features from each segment and sends these features to an inference model 110 to learn a user's transportation mode or modes 112. In one implementation, example features for a segment include length, mean velocity, expectation of velocity, covariance of velocity, top three velocities and top three accelerations from each segment. Note that because the features of a segment may be influenced by an abnormal point/positional error, top three velocities and top three accelerations are selected instead of the maximum velocity and maximum acceleration. Further note that the segmentation mechanism 104 uses length data, velocity data and acceleration data, and may work in conjunction with the feature extraction mechanism 106 as indicated in FIG. 1 via the dashed arrow between these example components.

Various techniques may be considered to determine the predicted transportation modes, such as when selecting the inference model 110. For example, each of the segments of GPS tracking data may be regarded as an independent instance, which is then classified using general classifiers, such as a decision tree-type classifier. Other suitable types of models that may be implemented as the inference model 110 include Bayesian Net and Support Vector Machine (SVM) models. After the inference model 110 predicts the transportation modes 112, a post-processing mechanism 114 that considers transition probabilities 116 between different transportation modes may be used to improve the prediction accuracy and provide final results 120.

Figure 3:
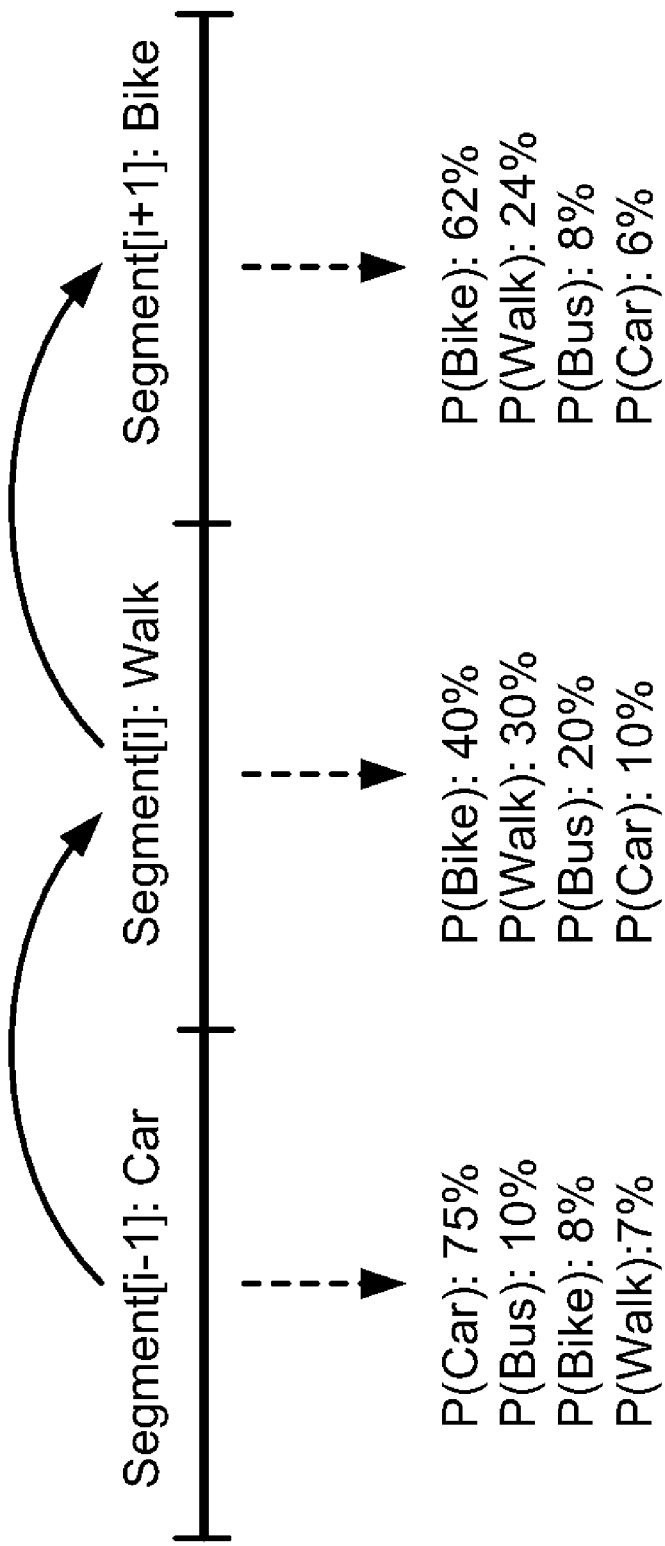
FIG. 3 is a representation of probability data for segments determined from features extracted from GPS data, in which post-processing corrects prediction errors.

In one example, after the inference process, the predicted transportation modes are ranked by their probability values, as depicted in FIG. 3. However, directly selecting the most likely transportation mode as the final results may be incorrect. In the example of FIG. 3, before post-processing, the prediction-based ranking is Car, followed by Bike followed by Bike. In actuality, this ranking is erroneous, as the correct prediction is Car, followed by Walk followed by Bike.

By post-processing, which considers the conditional probability between different transportation modes, the prediction accuracy may be improved; for example, it is more likely that a user exiting a car will walk to a bicycle than directly switch to a bicycle. If in a segment such as the segment i-1 in FIG. 3, the probability of the top transportation mode exceeds a threshold (e.g., seventy percent in one example implementation), this transportation mode is used as the final prediction result on this segment. Post-processing recalculates the probability of each candidate transportation mode based on its adjacent segment, e.g., segment i, according to the following equations:

$$\text{Segment}[i] \cdot P(\text{Bike}) = \text{Segment}[i] \cdot P(\text{Bike}) \times P(\text{Bike}|\text{Car}), \quad (1)$$

$$\text{Segment}[i] \cdot P(\text{Walk}) = \text{Segment}[i] \cdot P(\text{Walk}) \times P(\text{Walk}|\text{Car}), \quad (2)$$

where P(Bike|Car) and P(Walk|Car) stands for the transition probability from Car to Bike and from Car to Walk, respectively. Segment[i]·P(Bike) represents the probability of Bike on the segment i. After the calculations, the candidate transportation mode with the maximum probability is used as the final results. In the example of FIG. 3, because the transition probability between Car and Bike is very small, the probability of Bike is less than that of Walk after the post-processing computations corresponding to equations (1) and (2).

An alternative inference technique regards the GPS 102 data as a kind of sequential data when using the features 108. To this end, conditional random field (CRF) 118, a framework for building probabilistic models to segment and label sequence data, may be leveraged to perform the inference into the final results 120. Note that because the conditional probabilities between different transportation modes are considered in the conditional random field framework's graphical model, post-processing is not needed.

Figure 4:
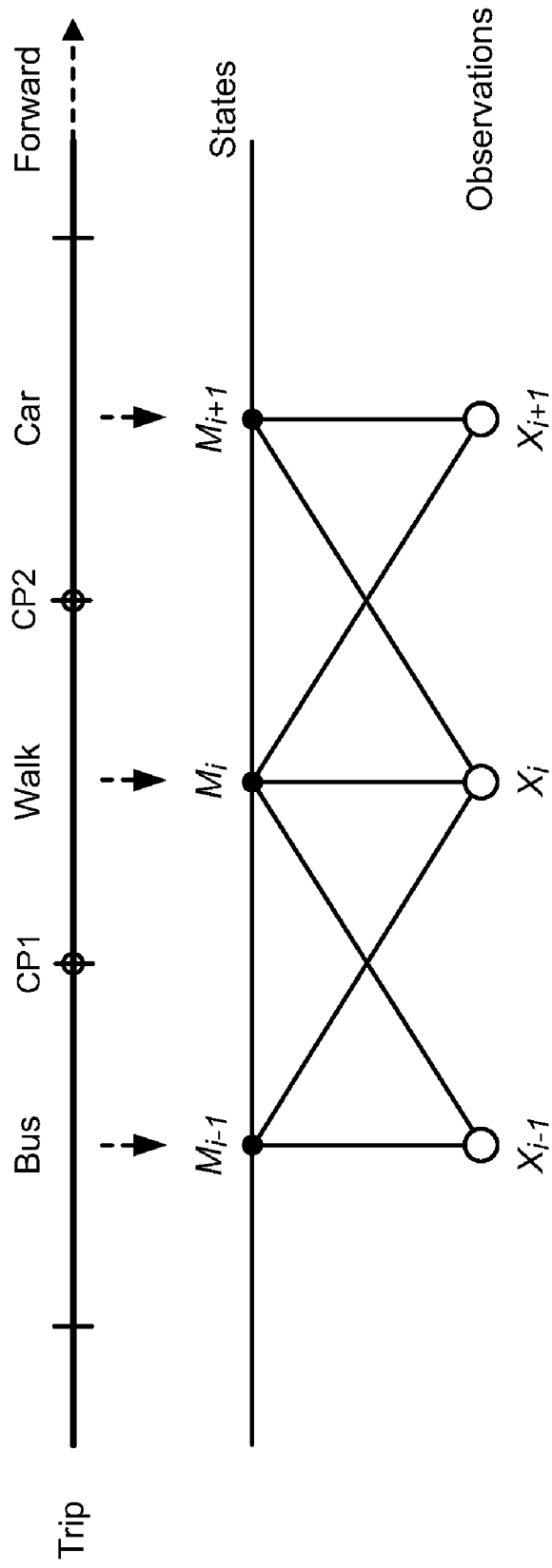
FIG. 4 is a representation of a graphical model corresponding to inferring transportation modes via a conditional random field inference framework.

By way of example, FIG. 4 depicts a trip where a person changes transportation modes from Bus to Walk, and then to Car. After being partitioned via the two change points CP1 and CP2, the trip is divided into three segments. The upper line of the graphical model is a sequence of states $\{\ldots, M_{i-1}, M_i, M_{i+1}, \ldots\}$ represented by black nodes, while each white node $\{\ldots, X_{i-1}, X_i, X_{i+1}, \ldots\}$ on the lower line denotes the observation of corresponding state. Each observation and corresponding state compose an instance $<X_i, M_i>$, and these consecutive instances construct a sequence. In one example approach, each state represents the transportation mode of a segment while an observation comprises the features extracted from the segment. The lines connecting a state $M_i$ to its adjacent observations $X_{i-1}$ and $X_{i+1}$ signify that each state not only depends on the current observation, but also depends on its previous and next observation. In other words, a person's present transportation mode has a close relationship with the modes of both the previous and the next segment.

Figure 5:
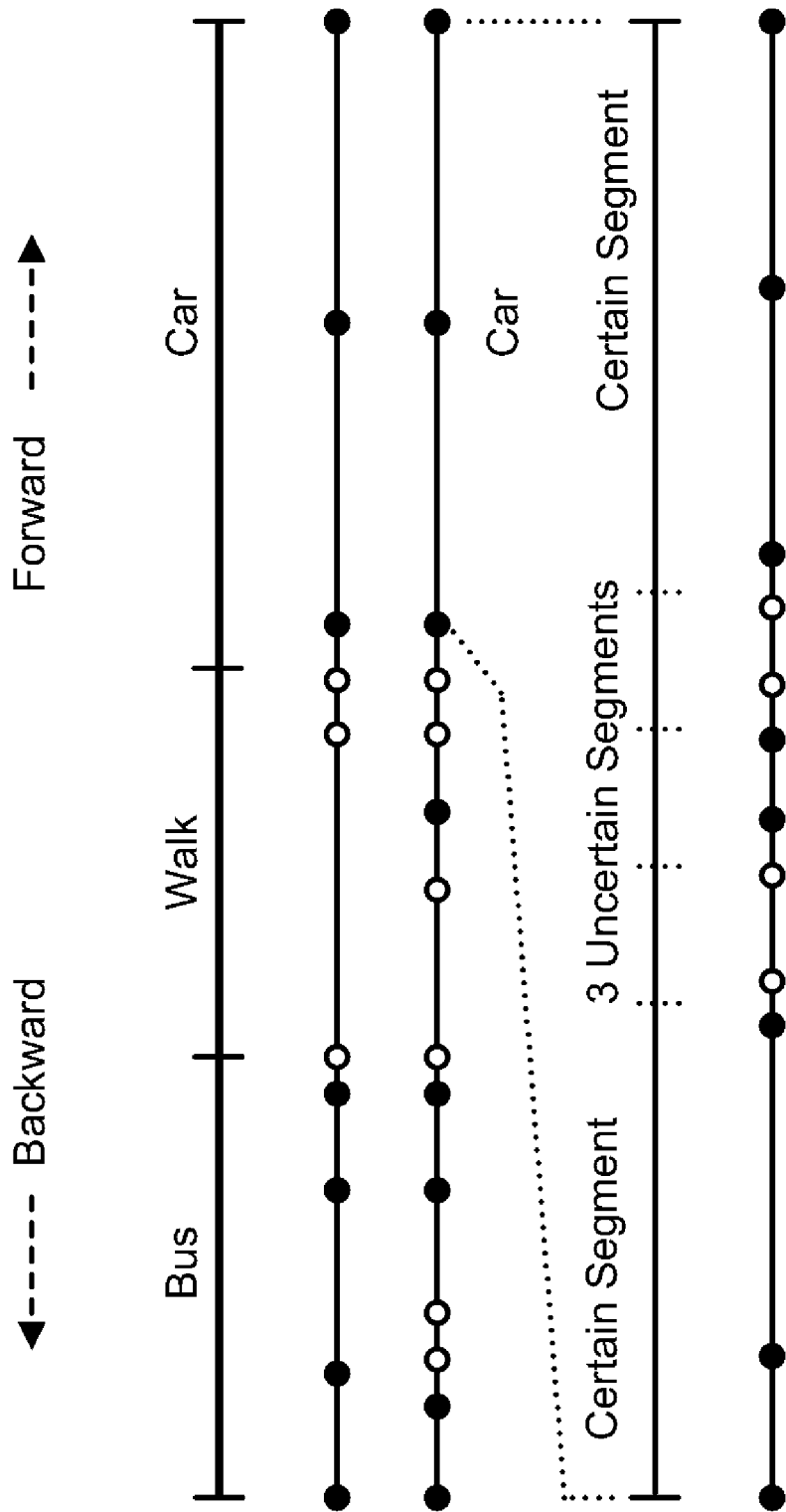
FIG. 5 is a representation of a set of segments and data points exemplifying the detection of change points.
Figure 6A:
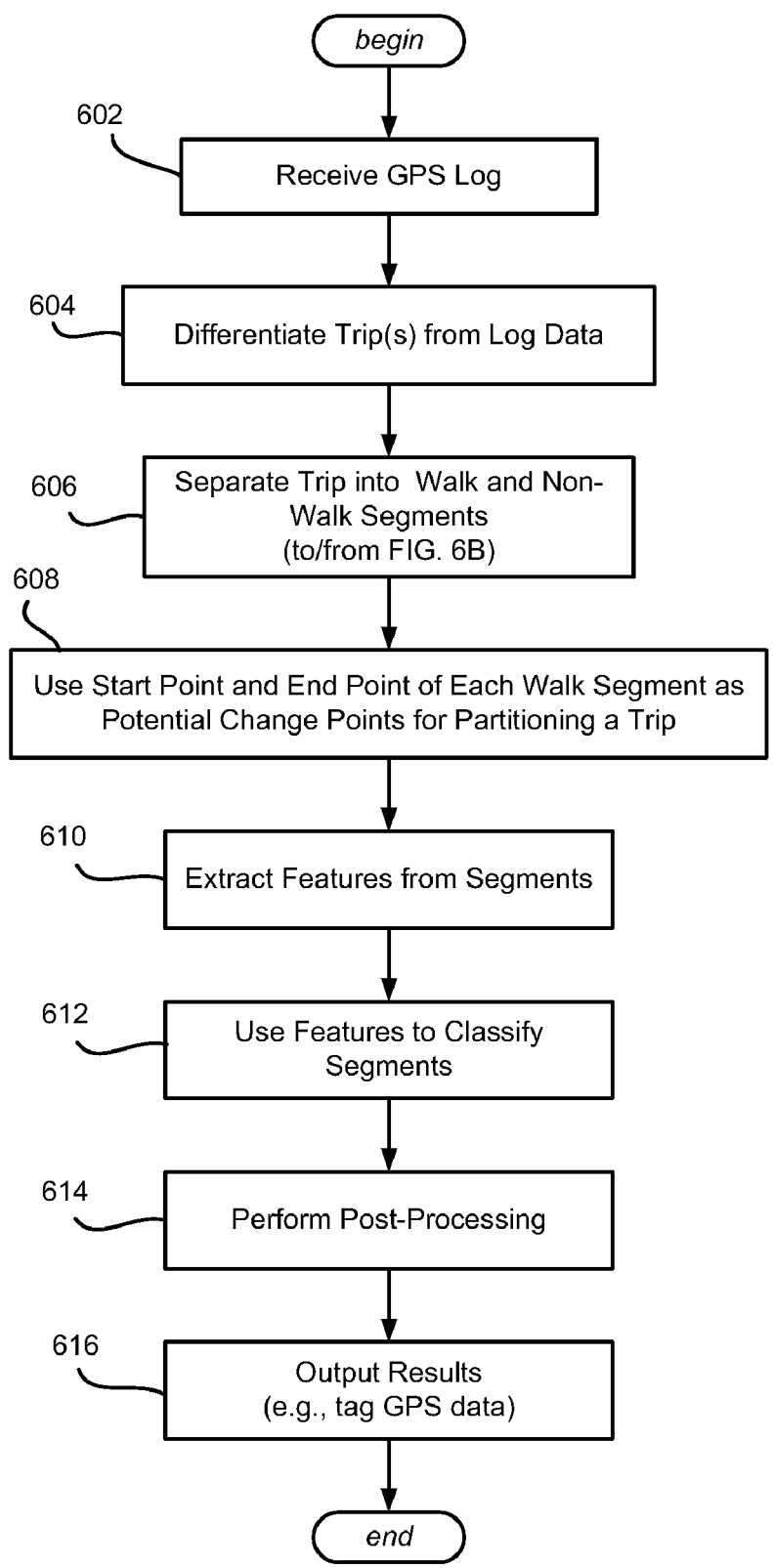
FIGS. 6A and 6B comprise a flow diagram showing example steps taken to process GPS data to determine transportation modes.
Figure 6B:
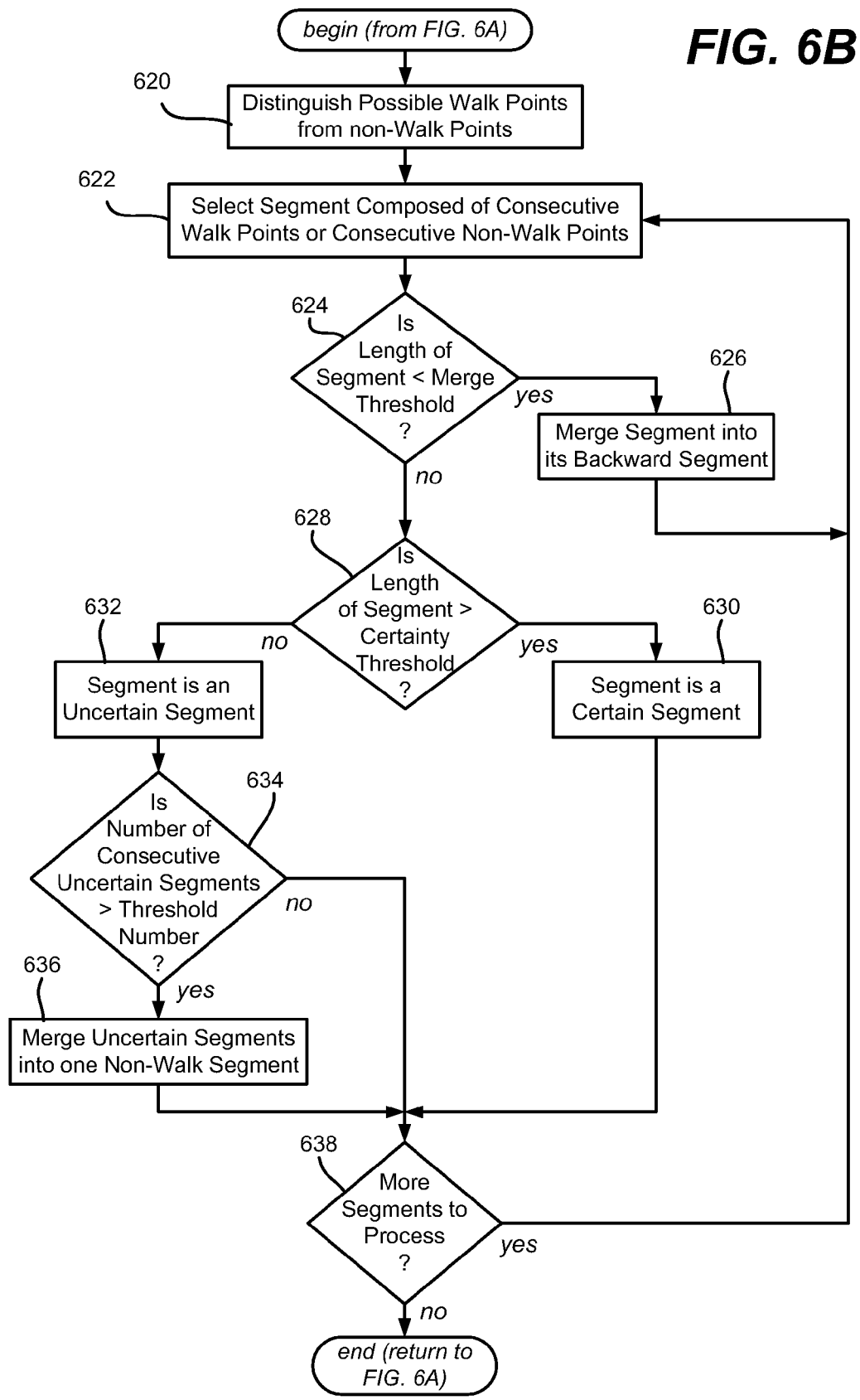

FIG. 5 is an example representing a person changing transportation modes from Bus to Car, using Walk as a transition mode. FIGS. 6A and 6B comprise a flow diagram representing example steps that may be used to predict these modes. In general, the steps of FIGS. 6A and 6B first detect probable walk segments within a trip by determining change points, which are then used to partition the trip into alternating walk segments and non-walk segments. Later, via each segment's features, the segments can be classified as walk, bus, car and/or bicycle; note that in one example implementation, the mode of transportation is predicted as one of four modes, namely Bike, Bus, Car and Walk, although as can be readily appreciated in alternative implementations the features may be processed to predict other modes. Further, in this example implementation, "Car" is one mode, regardless of whether the person is riding in a private vehicle or taking a taxicab.

Given real world observations as well as the knowledge mined from GPS data, the change points are first determined by differentiating walk and non-walk segments of a trip. This initial categorization into two classes (walk or non-walk) rather than directly into four classes {Bike, Bus, Car, Walk}, reduces the complexity of segmentation. Subsequently, the features of each segment may be extracted to infer the most probable transportation mode.

Step 602 of FIG. 6A represents receiving a GPS log, which at step 604 has its data partitioned into trips based on timing, e.g., generally fixed durations over twenty minutes delineate separate trips. Then, for a given trip (processing may be performed for each trip), step 606 separates the trip into walk and non-walk segments. FIG. 6B provides additional details on the separation.

More particularly, step 620 of FIG. 6B represents distinguishing the possible walk points from more definite non-walk points. For example, using a loose upper bound of velocity (Vt) and of acceleration (at), such as v=1.8 m/s and a=0.6 m/s$^2$, acceptable results with reasonably good precision are provided; a person exceeding either of those bounds is not walking at the corresponding point.

As shown in FIG. 5, each possible walk point (the white points in FIG. 5, in contrast to the black points which represent non-walk points) corresponds to a GPS point whose velocity (P.V) and acceleration (P.a) are both smaller than the given bound. As shown in the uppermost set of points in FIG. 5, in an ideal case, only one Walk segment will be detected from this trip.

However, as depicted by the middle set of points in FIG. 5, when a car or bus moves slowly, GPS points from actual non-Walk segments may be detected as possible walk points. Also, because of errors, points from a Walk segment may exceed the bound and become non-walk points. To reduce the probability of such errors, step 624 evaluates the length of each retrieved segment against a certain distance, i.e., a merge threshold. If shorter than the threshold, the segment is merged into its backward (previous) segment. In other words, if the length of a segment composed by consecutive walk points or non-walk points less than a merging threshold distance, the segment is merged into its backward segment (if any) at step 626.

By way of example, the two walk points in the segment of Bus within the middle set of points do not form a segment because of the relatively short distance between them. The same (or similar) criterion is also applied to handle any outlier points (the black points) in the Walk segment.

After any backwards merging, the trip is divided into a series of one or more alternate Walk segments and non-Walk segments. However, as represented by the lower set of points in FIG. 5, the walk points are only possible walk points, because for example a non-walking user may have encountered traffic congestion. It is not correct for the inference model to directly predict transportation modes over the features extracted from such uncertain segments.

In general, the longer a segment is, the richer the features of its transportation mode. As a result, a longer segment leads to a more correct prediction of that segment's corresponding transportation mode. In contrast, the shorter a segment is, the higher the uncertainty.

To avoid incorrect partitioning based on short segments, step 628 evaluates the length of the segment against a certainty threshold distance (e.g., fifty meters) If the segment length exceeds the threshold, the segment is considered a "certain" segment (step 630). Otherwise the segment is considered an "uncertain" segment (step 632), that is, the process is uncertain as to the transportation mode of this segment even if currently considered a Walk segment. If at step 634 the number of consecutive uncertain segments exceeds a threshold number, e.g., three in one example implementation, such a set of uncertain segments is considered to be a non-Walk segment. In general, users ordinarily do not often change their transportation modes within such a short distance; for example, as depicted by the lower set of points in FIG. 5, within a certain distance it is not realistic for a person to transition from Car to Walk to Car to Walk to Car. As the result, the middle three segments between the two certain segments are very likely also non-Walk Segments, that is, Car in this particular example. Thus, the process merges the three uncertain segments into one non-walk segment before performing the subsequent inference. Step 638 represents repeating the processing for other segments of the trip.

At this time, the start point and end point of each Walk segment are defined as potential change points, which are then used to partition a trip, as generally represented via step 608 of FIG. 6A.

Step 610 represents extracting other features from the segments, which step 612 uses to classify the segments. For example, non-Walk segments may be classified as Car, Bus or Bicycle based on their corresponding features.

Step 614 represents performing post-processing (if appropriate for the inference model) as described above. Step 616 represents outputting the results, e.g., tagging the GPS data with the predicted transportation modes.

As can be readily appreciated, the above-described processing can infer compound trips containing more than one kind of transportation mode. In addition, the processing can correctly detect the transitions between different transportation modes. This may be accomplished only via raw GPS data, independent of other information from maps and other sensors. Further, the model learned from the dataset of some users can be applied to infer transportation modes from the GPS data of others.

Exemplary Operating Environment

Figure 7:
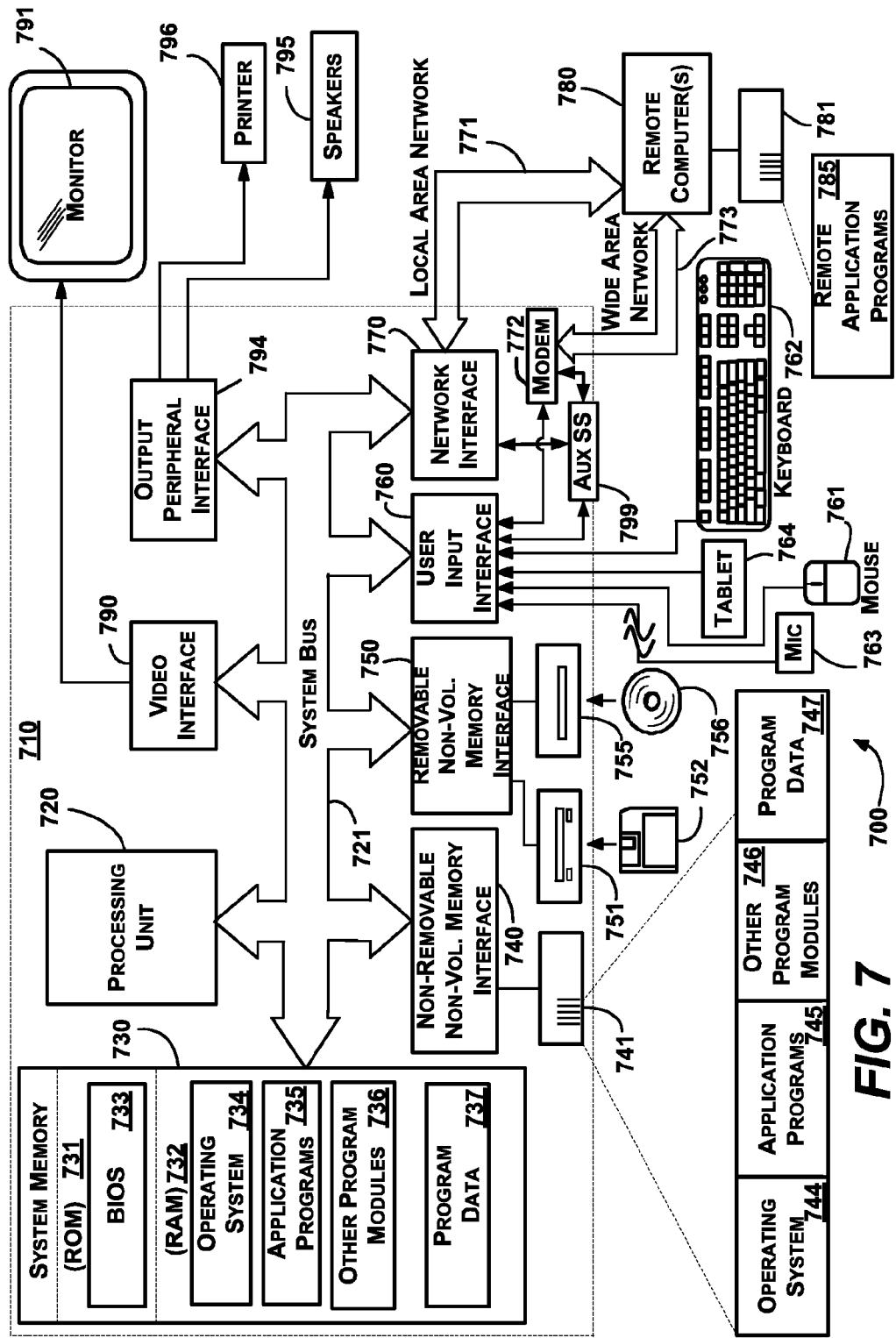
FIG. 7 shows an illustrative example of a computing environment into which various aspects of the present invention may be incorporated.

FIG. 7 illustrates an example of a suitable computing and networking environment 700 on which the examples of FIGS. 1-6 may be implemented. For example, the various mechanisms of FIG. 1 may be implemented in the computer system 710. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 710. Components of the computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer-readable media. Computer-readable media can be any available media that can be accessed by the computer 710 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 710. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736 and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, described above and illustrated in FIG. 7, provide storage of computer-readable instructions, data structures, program modules and other data for the computer 710. In FIG. 7, for example, hard disk drive 741 is illustrated as storing operating system 744, application programs 745, other program modules 746 and program data 747. Note that these components can either be the same as or different from operating system 734, application programs 735, other program modules 736, and program data 737. Operating system 744, application programs 745, other program modules 746, and program data 747 are given different numbers herein to illustrate that, at a minimum, they are different copies. A user may enter commands and information into the computer 710 through input devices such as a tablet, or electronic digitizer, 764, a microphone 763, a keyboard 762 and pointing device 761, commonly referred to as mouse, trackball or touch pad. Other input devices not shown in FIG. 7 may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. The monitor 791 may also be integrated with a touch-screen panel or the like. Note that the monitor and/or touch screen panel can be physically coupled to a housing in which the computing device 710 is incorporated, such as in a tablet-type personal computer. In addition, computers such as the computing device 710 may also include other peripheral output devices such as speakers 795 and printer 796, which may be connected through an output peripheral interface 794 or the like.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include one or more local area networks (LAN) 771 and one or more wide area networks (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760 or other appropriate mechanism. A wireless networking component 774 such as comprising an interface and antenna may be coupled through a suitable device such as an access point or peer computer to a WAN or LAN. In a networked environment, program modules depicted relative to the computer 710, or portions thereof, may be stored in the remote memory storage device. By way of example, and not limitation, FIG. 7 illustrates remote application programs 785 as residing on memory device 781. It may be appreciated that the network connections shown are exemplary and other means of establishing a communications link between the computers may be used.

An auxiliary subsystem 799 (e.g., for auxiliary display of content) may be connected via the user interface 760 to allow data such as program content, system status and event notifications to be provided to the user, even if the main portions of the computer system are in a low power state. The auxiliary subsystem 799 may be connected to the modem 772 and/or network interface 770 to allow communication between these systems while the main processing unit 720 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
  processing positioning data into a plurality of segments, the positioning data comprising location-related information and timing-related information; and
  determining a predicted mode of transportation for respective segments.

2. The method of claim 1, comprising separating the positioning data into a plurality of trips, processing the positioning data into the plurality of segments corresponding to one of the trips.

3. The method of claim 1, processing the positioning data into a plurality of segments comprising merging a segment below a threshold length into another segment.

4. The method of claim 1, determining the predicted mode of transportation for respective segments comprising differentiating between walk segments and non-walk segments based on features comprising velocity or acceleration, or both velocity and acceleration.

5. The method of claim 4, differentiating between the walk segments and the non-walk segments comprising distinguishing between certain segments and uncertain segments based on a length of respective segments.

6. The method of claim 5, comprising determining whether a threshold number of consecutive segments are uncertain segments corresponding to walk segments, and if so, merging the uncertain segments corresponding to the walk segments into a non-walk segment.

7. The method of claim 1, determining the predicted mode of transportation for respective segments comprising extracting features corresponding to respective segments, and classifying respective segments based on respective features of respective segments.

8. The method of claim 1, determining the predicted mode of transportation for respective segments comprising determining a set of initial probabilities for possible modes of transportation for respective segments, and recalculating the initial probabilities using transition probabilities based on a transportation mode of at least one adjacent segment.

9. In a computing environment, a system comprising:
a segmentation mechanism configured to separate GPS data into a plurality of segments;
a feature extraction mechanism configured to extract features for respective segments; and
an inference model configured to use at least some of the features extracted for respective segments to infer a transportation mode for respective segments.

10. The system of claim 9, the inference model comprising a conditional random field framework.

11. The system of claim 9, the inference model comprising a decision tree classifier, a Bayesian Net inference model, or a support vector machine inference model, or any combination of a decision tree classifier, a Bayesian Net inference model, or a support vector machine inference model.

12. The system of claim 11, comprising a post-processing mechanism coupled to the inference model, the post-processing mechanism configured to recalculate probabilities provided by the inference model into final probabilities using transition probabilities.

13. The system of claim 9, the features extracted from GPS data comprising segment length, velocity data or acceleration data, or any combination of segment length, velocity data or acceleration data, for each segment.

14. The system of claim 9, the segmentation mechanism comprising means for merging a segment below a threshold length into another segment.

15. The system of claim 9, the segmentation mechanism comprising means for differentiating between walk segments and non-walk segments, means for distinguishing between certain segments and uncertain segments based on a length of respective segments, and means for merging uncertain segments into a non-walk segment.

16. One or more computer-readable media having computer-executable instructions, which when executed perform actions, comprising:
processing GPS data into walk segments and non-walk segments based on velocity data or acceleration data, or both velocity data and acceleration data;
determining a length of respective segments;
comparing the lengths of the segments against a merge threshold distance, and merging any segment having a length below the threshold distance into another segment;
comparing the lengths of the segments against a certainty threshold distance;
and for any uncertain segments that do not meet the certainty threshold distance, determining whether a number of consecutive uncertain segments is present, and if so, merging the consecutive uncertain segments into a non-walk segment; and
determining a predicted mode of transportation for respective walk segments and for respective non-walk segments, based on features of respective segments.

17. The one or more computer-readable media of claim 16, the actions comprising separating the GPS data into trips based on time duration information determined from the GPS data.

18. The one or more computer-readable media of claim 16, determining the predicted mode of transportation comprising determining probabilities for candidate modes of transportation for respective segments.

19. The one or more computer-readable media of claim 18, determining the predicted mode of transportation comprising, for at least one given segment, modifying at least some of the probabilities for candidate modes of transportation for the at least one given segment based on transition probability data corresponding to at least one adjacent segment, and selecting as the transportation mode for the at least one given segment the candidate transportation mode having a highest probability value after recalculation.

20. The one or more computer-readable media of claim 16, the actions comprising tagging the GPS data with information corresponding to the predicted mode of transportation for respective segments.

* * * * *

UNITED STATES PATENT AND TRADEMARK OFFICE
CERTIFICATE OF CORRECTION

PATENT NO. : 8,015,144 B2  Page 1 of 1
APPLICATION NO. : 12/037305
DATED : September 6, 2011
INVENTOR(S) : Yu Zheng et al.

It is certified that error appears in the above-identified patent and that said Letters Patent is hereby corrected as shown below:

In column 11, line 19, in Claim 8, delete "segments," and insert -- segments --, therefor.

Signed and Sealed this
Twenty-fourth Day of April, 2012

David J. Kappos
*Director of the United States Patent and Trademark Office*